United States Patent
Brocard et al.

(10) Patent No.: US 8,205,597 B2
(45) Date of Patent: Jun. 26, 2012

(54) AIRCRAFT ENGINE FUEL SUPPLY

(75) Inventors: Jean-Marie Brocard, Rubelles (FR); Regis Michel Paul Deldalle, Servon (FR); Philippe Galozio, Lieusaint (FR); Michel Martini, Ponthierry (FR); Alain Michel Varizat, Bois le Roi (FR)

(73) Assignee: SNECMA, Paris (FR)

( * ) Notice: Subject to any disclaimer, the term of this patent is extended or adjusted under 35 U.S.C. 154(b) by 1111 days.

(21) Appl. No.: 11/816,586

(22) PCT Filed: Feb. 17, 2006

(86) PCT No.: PCT/EP2006/060073
§ 371 (c)(1),
(2), (4) Date: Mar. 7, 2008

(87) PCT Pub. No.: WO2006/087377
PCT Pub. Date: Aug. 24, 2006

(65) Prior Publication Data
US 2011/0139123 A1  Jun. 16, 2011

(30) Foreign Application Priority Data

Feb. 17, 2005  (FR) ...................................... 05 01640

(51) Int. Cl.
*F02M 69/54* (2006.01)
*F02C 7/22* (2006.01)
*F02C 9/26* (2006.01)
(52) U.S. Cl. ......................................... 123/457; 60/790
(58) Field of Classification Search ............... 60/39.281, 60/734, 764, 790; 701/100; 123/457, 458, 123/495, 514
See application file for complete search history.

(56) References Cited

U.S. PATENT DOCUMENTS

| | | | | |
|---|---|---|---|---|
| 2,780,172 | A | * | 2/1957 | Coar ................................. 417/62 |
| 2,916,875 | A | * | 12/1959 | Morley et al. ............... 60/39.281 |
| 3,774,394 | A | * | 11/1973 | Criffield ..................... 60/39.091 |
| 3,801,228 | A | * | 4/1974 | Mueller ......................... 417/282 |
| 4,245,964 | A | * | 1/1981 | Rannenberg ................... 417/287 |
| 4,280,323 | A | | 7/1981 | Jersey et al. |
| 4,607,486 | A | * | 8/1986 | Cole ................................ 60/734 |

(Continued)

FOREIGN PATENT DOCUMENTS

| | | |
|---|---|---|
| EP | 0 377 292 | 7/1990 |
| EP | 0 657 651 | 6/1995 |
| FR | 2 258 526 | 8/1975 |
| GB | 758 679 | 10/1956 |
| GB | 2451575 A * | 2/2009 |
| JP | 11303652 | 11/1999 |

OTHER PUBLICATIONS

U.S. Appl. No. 11/816,535, filed Aug. 17, 2007, Brocard, et al.

*Primary Examiner* — Mahmoud Gimie
*Assistant Examiner* — David Hamaoui
(74) *Attorney, Agent, or Firm* — Oblon, Spivak, McClelland, Maier & Neustadt, L.L.P.

(57) ABSTRACT

A centrifugal pump driven by mechanical coupling with an engine has a low pressure inlet receiving fuel from a fuel circuit of an aircraft, a high pressure outlet connected to a regulator circuit for regulating the flow rate of fuel supplied to the engine, and an assistance pump unit that is electrically controlled, having an inlet connected to the aircraft fuel circuit and an outlet connected to the flow rate regulator circuit so as to deliver, via its outlet, fuel that is at a predetermined minimum pressure, the pressure of the fuel supplied to the regulator circuit being the higher of the pressures delivered by the centrifugal pump and the assistance pump unit.

11 Claims, 3 Drawing Sheets

U.S. PATENT DOCUMENTS

| | | | |
|---|---|---|---|
| 5,116,362 A * | 5/1992 | Arline et al. | 60/734 |
| 5,118,258 A * | 6/1992 | Martin | 417/3 |
| 5,315,818 A * | 5/1994 | Smith | 60/39.281 |
| 5,709,079 A * | 1/1998 | Smith | 60/39.281 |
| 7,234,293 B2 * | 6/2007 | Yates et al. | 60/39.281 |
| 7,401,461 B2 * | 7/2008 | Eick et al. | 60/39.091 |
| 7,497,083 B2 * | 3/2009 | Yates et al. | 60/734 |
| 7,770,388 B2 * | 8/2010 | Desai | 60/420 |
| 2004/0117102 A1 | 6/2004 | Weir et al. | |
| 2005/0284148 A1 * | 12/2005 | Wernberg et al. | 60/734 |
| 2008/0163931 A1 * | 7/2008 | Brocard et al. | 137/10 |

\* cited by examiner

AIRCRAFT ENGINE FUEL SUPPLY

The invention relates to a device for supplying fuel to an aircraft engine, and particularly but not exclusively to a gas turbine airplane engine.

It is common practice for such a supply device to include a positive-displacement gear pump driven by the engine via an accessory gear box coupled to a shaft of the engine. The positive-displacement pump receives fuel coming from the fuel circuit of the airplane via a booster pump. An electro-hydraulic metering valve is mounted in a supply pipe connecting the outlet from the positive-displacement pump to a combustion chamber of the engine. A fuel return circuit with a controlled variable-restriction bypass valve is connected between the outlet and the inlet of the positive-displacement pump. The bypass valve is hydraulically controlled to maintain the head loss through the metering valve at a value that is constant or almost constant, thus enabling fuel to be delivered at the desired rate corresponding to the position of the metering valve. An engine over-speed or over-thrust valve can be mounted in the supply pipe in series or in parallel with the metering valve to cause the flow rate of fuel to be decreased in response to detecting an excessive speed or thrust that might arise due to failure of the metering valve or of its control means. A cutoff valve is generally provided in series with the metering valve and the over-speed valve to turn off the engine by interrupting its fuel supply on direct control from the cockpit. Reference can be made in particular to documents EP 1 355 054 and US 2004/0117102.

Proposals have also been made to supply fuel to a gas turbine engine by means of a centrifugal pump that enables fuel to be delivered at a pressure that is determined as a function of the speed of rotation of the pump. Document EP 1 344 917 shows the use of such a centrifugal pump that is driven by an electric motor under the control of an electronic control circuit, thus setting the speed of the pump, and hence the pressure of the fuel at the outlet from the pump. That document also describes an electrically-driven positive-displacement gear pump that operates in parallel with the centrifugal pump to provide a priming function and to ensure that a minimum flow rate of fuel can always be delivered, the centrifugal pump and the positive-displacement pump being themselves fed from a low pressure booster pump.

U.S. Pat. No. 3,946,551 describes a fuel supply device with an electrically-controlled vane pump mounted in series with a centrifugal pump driven by the engine. The electrically-controlled vane pump serves to raise the pressure of the fuel to the value needed while starting the engine (starting assistance) and to meter the fuel. Such a configuration presents several drawbacks. Since the electrically-controlled vane pump operates continuously for metering purposes, it needs to present large capacity in order to be capable of accepting the maximum flow rate of fuel. It therefore needs to be dimensioned accordingly. In addition, with a large-capacity pump, metering accuracy at slow speeds of rotation is smaller even though precise flow rate regulation is required likewise while starting. Furthermore, in the event of the vane pump breaking down, fuel is no longer metered.

The document "Patent abstracts of Japan", Vol. 200, No. 02, Feb. 29, 2000 (JP 11 303 652) discloses a circuit for supplying fuel to a gas turbine, the circuit having two pumps connected in parallel: a main pump driven by the gas turbine; and a secondary pump driven by an electric motor. The secondary pump is used for cold starting while the main pump is used when hot starting. Nothing is said about the main pump and any possible switching of operation between the pumps.

Document EP 0 657 651 shows an association of a centrifugal pump and a starting assistance pump, the starting assistance pump being driven mechanically on the same shaft as the centrifugal pump. Putting the assistance pump out of circuit makes it necessary for it to be emptied so as to avoid leaving any stagnant fuel that would become hot in equipment revolving at high speed. The mechanical drive of the assistance pump and the need to empty it complicates implementing the pump unit.

OBJECT AND SUMMARY OF THE INVENTION

An object of the invention is to provide a supply device for supplying fuel to an aircraft engine, which device presents better optimization in terms of weight and power consumption in comparison with the state of the art.

This object is achieved by a supply circuit comprising:
a regulator circuit for regulating the fuel flow rate, the circuit comprising a fuel flow rate measurement device, a controlled variable-restriction valve, and a control system connected to the flow rate measurement device and to the valve to control the valve as a function of a setpoint value for the flow rate of fuel to be supplied to the engine;
a centrifugal pump driven by mechanical coupling with the engine, having a low pressure inlet receiving fuel from a fuel circuit of the aircraft and a high pressure outlet connected to the fuel flow rate regulator circuit; and
an electrically controlled assistance pump unit having an inlet connected to the fuel circuit of the aircraft and an outlet connected to the flow rate regulator circuit, to deliver at its outlet, fuel at a predetermined minimum pressure,
the pressure of the fuel supplied to the regulator circuit being the greater of the pressures delivered in parallel by the centrifugal pump and by the assistance pump unit.

The use of a centrifugal pump driven by mechanical coupling rather than by an electric motor makes it possible to make best use of the mechanical power supplied by the engine, avoiding any intermediate transformation into electricity, which is inevitably a source of efficiency losses and of increasing weight.

The assistance pump unit serves to help the centrifugal pump while its drive from the engine is non-existent or insufficient for supplying the fuel flow rate regulator circuit with fuel at the minimum pressure.

In a first embodiment of the supply device, the assistance pump unit comprises a positive-displacement pump and a pressure release valve having a first inlet connected to the outlet of the positive-displacement pump, a second inlet connected to the fuel circuit of the aircraft, and an outlet connected to the inlet of the positive-displacement pump, the pressure release valve putting its first inlet into communication with its outlet when the pressure difference between its first inlet and its second inlet exceeds a predetermined threshold.

The inlet of the positive-displacement pump is then preferably connected to the high pressure outlet of the centrifugal pump.

In a second embodiment of the supply device, the assistance pump unit comprises a second centrifugal pump and an electric control circuit for driving the second centrifugal pump at a speed that enables it to deliver said predetermined minimum pressure.

In a third embodiment of the supply device, the assistance pump unit comprises a regenerative pump instead of and replacing the positive-displacement pump of the first embodiment.

The type of assistance pump chosen depends on the type of aircraft. Thus, the third embodiment is more particularly intended for aircraft having a gas turbine situated above the tank (such as helicopters, flying boats, etc.).

Means are preferably provided for stopping the assistance pump unit when the pressure of the fuel delivered to the flow rate regulator circuit or the speed of the engine exceeds a predetermined pressure or speed threshold.

Means may also be provided for restarting the assistance pump unit when the pressure of fuel delivered to the flow rate regulator circuit or the speed of the engine drops below a predetermined pressure or speed threshold.

Because the fuel flow rate regulator device includes a device for measuring fuel flow rate and a controlled variable-restriction valve, and also a control system connected to the flow rate measurement device and to the valve to control the valve as a function of a fuel flow rate setpoint value, the flow rate regulator does not need a fuel return circuit with a bypass valve between the outlet and the outlet of the main supply pump.

The flow rate measurement device may be a mass flow meter, a volumetric flow meter, or a hybrid device enabling flow rate to be measured on the basis of knowledge of the pressure drop and the flow section through the device.

The use of a mass flow meter can make it possible to regulate the fuel flow rate more accurately than when using a volumetric flow meter. The requirements of the engine are generally expressed in terms of weight of fuel. If the flow rate measurement is volumetric, then it is necessary to convert mass into volume, but the accuracy with which regulation is performed suffers because of uncertainty about the density of the fuel, since such density can vary as a function of external conditions and as a function of the fuel on board.

According to yet another feature of the supply circuit, the valve is a directly-controlled valve under electrical control.

The control system may include a local servo-control loop directly connected to the flow rate measurement device and to the valve. The term "local loop" is used herein to mean an electronic servo-control circuit that is external to the housing of the electrical module constituting the full authority digital engine control (FADEC) system.

Advantageously, the fuel flow rate regulator device comprises:
  a device for measuring fuel flow rate in a fuel supply pipe;
  a first controlled variable-restriction valve mounted in the supply pipe;
  a control system connected to the flow rate measurement device and to the first valve to control it to supply the engine with fuel at a desired flow rate;
  a second controlled variable-restriction valve mounted in the supply pipe in series with the first valve; and
  control means for the second valve enabling the engine to be supplied with fuel at an adjustable, reduced flow rate, in response to detecting over-speed or over-thrust of the engine.

The first and second valves may be directly-controlled valves that are controlled electrically.

BRIEF DESCRIPTION OF THE DRAWINGS

The invention can be better understood on reading the following description given by way of non-limiting indication and made with reference to the accompanying drawings, in which.

DETAILED DESCRIPTION OF EMBODIMENTS OF THE INVENTION

Figure 1:
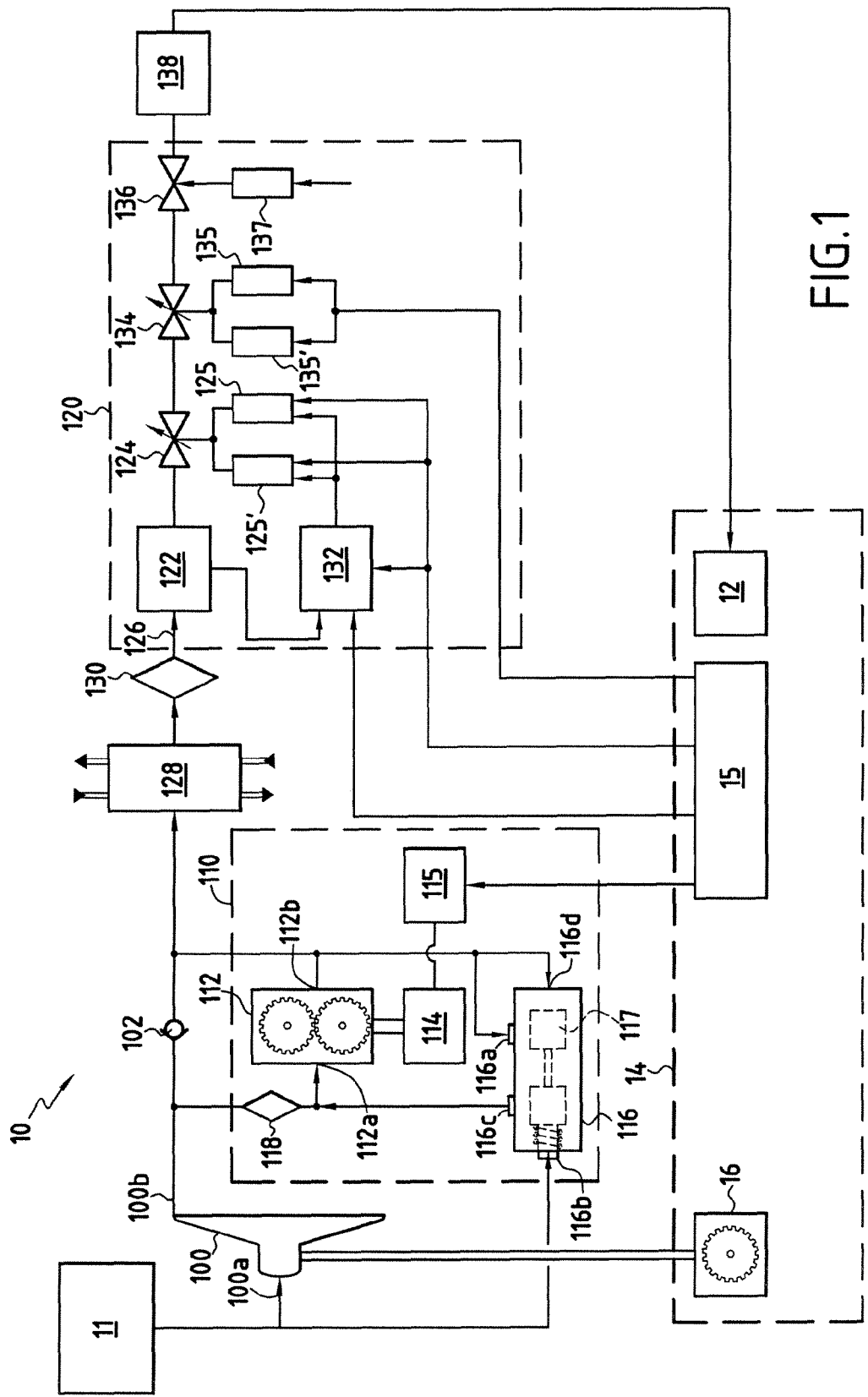
FIG. 1 shows an embodiment of a fuel supply device in accordance with the invention.

The fuel supply circuit 10 of FIG. 1 receives fuel from an airplane fuel circuit 11 and delivers a flow of fuel to a system 12 for injecting fuel into a combustion chamber of a gas turbine of an engine 14 fitted to the airplane, it being understood that the supply device described may be used for aircraft engines other than gas turbine airplane engines, e.g. helicopter engines.

The circuit 10 comprises a centrifugal pump 100 constituting the main pump of the circuit. The pump 100 has an inlet 100a connected to the fuel circuit 11, and a high pressure outlet 100b delivering fuel at a pressure that is a function of the speed of rotation of the pump. The pump is driven by a mechanical connection with the accessory drive module 16 of the engine 14 and which is coupled to the turbine thereof.

An assistance pump unit 110 comprises a positive-displacement pump 112 having an inlet 112a connected to the outlet of the centrifugal pump 100, an electric motor 114 for driving the pump 112 under the control of an electric control circuit 115, and a pressure release valve 116.

By way of example, the pump 112 is a gear pump. A filter 118 can be mounted between the outlet 100b of the pump 100 and the inlet 112a of the pump 112 to protect it against solid particles that might be conveyed by the fuel coming from the circuit 11. The operation of the centrifugal pump 100 is not affected by such particles.

The electric control circuit 115 is connected to a full authority digital engine control (FADEC) system 15 of the engine 14 in order to control operation of the pump 112. The control circuit 115 could also be integrated in the control system 15.

The pressure release valve 116 has a first inlet 116a connected to the outlet 112b of the pump 112, a second inlet 116b connected to the airplane fuel circuit and providing a reference pressure to the valve 116, and an outlet 116c connected to the inlet 112a of the pump 112. The pressure release valve is adjusted to open and put the first inlet 116a into communication with the outlet 116b when the pressure difference between the inlets 116a and 116b exceeds a predetermined threshold. To make the valve 116, it is possible to use a slider 117 that is subjected at one end to the outlet pressure from the pump 112 via a pressure takeoff 116d, and at an opposite end to the pressure at the second inlet 116b plus a force exerted by a spring.

The outlet 100b of the centrifugal pump 100 is connected via a check valve 102 to the inlet of a circuit 120 for regulating the flow rate of fuel delivered to the fuel injector system 12, while the outlet 112b of the pump 112 is connected to the inlet of the regulator circuit 120.

Operation is as follows.

The pressure release valve 116 is set to open at a pressure corresponding to a predetermined minimum pressure Pm enabling the minimum fuel requirement of the engine 14 to be satisfied on starting.

The positive-displacement pump 112 is started and driven at a speed suitable for delivering fuel at a rate that exceeds the initial need of the engine 14 as set by the regulator system 120, such that the pressure at the outlet 112b of the pump 112 reaches the minimum pressure Pm almost instantaneously (see curve A in FIG. 2), thereby causing the pressure release valve 116 to open. The pressure at the outlet 100b of the centrifugal pump begins to increase on the engine 14 starting (curve B in FIG. 2) but does not initially cover the fuel pressure requirement. The pressure at the outlet 112b of the pump 112 is then set at the pressure value Pm, the fuel supplied by the pump 112 and not delivered to the injector circuit 12 then flowing in a closed circuit between the outlet and the inlet of the pump 112 via the valve 116. The check valve 102 prevents return of the fuel delivered by the pump 112 to the centrifugal pump 100.

The pump unit 110 thus provides an assistance function on starting, the valve 116 enabling the positive-displacement pump 112 to be converted into a pump that delivers fuel at a pressure, in the same manner as a centrifugal pump. Nevertheless, unlike that which can happen with a centrifugal pump, the operation of the positive-displacement pump 112 is unaffected by the presence of air or vapor in the fuel taken initially from the circuit 11.

Figure 2:
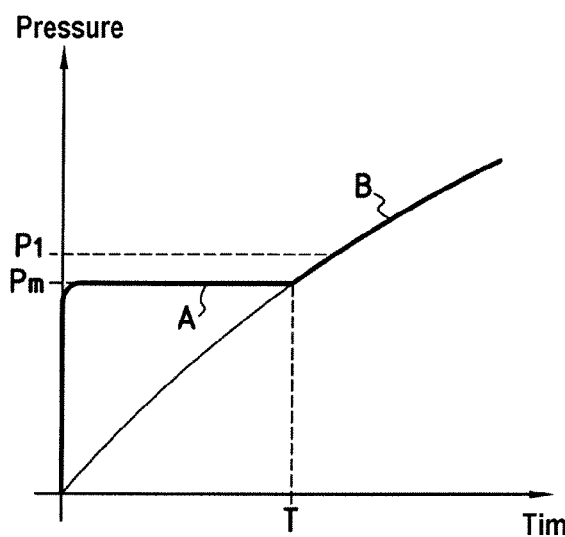
FIG. 2 shows the variation over time in the pressure delivered by the centrifugal pump and an assistance pump unit for providing assistance in starting the engine.

The pressure at the outlet from the pump 100 increases with increasing engine speed, and when said pressure exceeds the value Pm, the check valve 102 opens (transition point T in FIG. 2). The pressure supplied to the flow rate regulator circuit 120 is then that supplied by the centrifugal pump 100.

In FIG. 2, the bold portions of curves A and B represent the pressure of the fuel as delivered to the regulator circuit 120. The assembly comprising the pump 100, the pump unit 110, and the check valve 102 behaves like a pumping system that enables a preponderant transition to be obtained between the pumps 112 and 100, the pressure of the fuel supplied to the regulator circuit being the greater of the pressures delivered in parallel at the outlet from the pumps 112 and 100.

Once the pump 100 has taken over from the pump 112, the pump 112 can be stopped. Stopping may be controlled in response to a pressure threshold $P_1$ being exceeded at the outlet from the pump 100, or in response to a speed threshold $V_1$ of the engine 14 being exceeded. This can be controlled by the automatic control system 15 acting on the electric control circuit 115 in response to information supplied by a fuel pressure sensor or by a sensor for sensing the speed of the turbine of the engine 14. The thresholds $P_1$ and $V_1$ may be selected to correspond to a value greater than Pm.

It should be observed that the pump unit 110 can be used not only on starting, but also during other stages of engine operation, e.g. when idling or when operating slowly under circumstances in which the centrifugal pump 100 becomes incapable of delivering fuel at the minimum pressure Pm. It then suffices to restart the motor 114 by the control circuit 115 if the fuel pressure is detected as dropping below a pressure threshold $P'_1$ or if the speed of the engine 14 is detected as dropping below a speed threshold $V'_1$, where the thresholds $P'_1$ and $V'_1$ are selected to be less than $P_1$ and $V_1$.

The pump unit 110 then behaves not only like an assistance unit on starting, but also as an assistance unit at low engine speeds so as to ensure that the minimum pressure at which fuel is supplied under any circumstances is a sufficient pressure.

In the embodiment shown in FIG. 1, the pump 112 is connected to the fuel circuit 11 via the centrifugal pump which is "transparent" for the starting pump 112. This connection enables the pump 112 to benefit from the increase in pressure caused by the pump 100 as soon as it begins to be driven.

It would naturally be possible to connect the inlet 112a of the pump 112 to the fuel circuit 11 via a filter, without passing through the centrifugal pump 100.

In another variant embodiment, the positive-displacement pump 112 can be replaced by a regenerative pump, in particular for aircraft having a gas turbine situated above the tank, as in helicopters, flying boats, etc. . . . .

Figure 3:
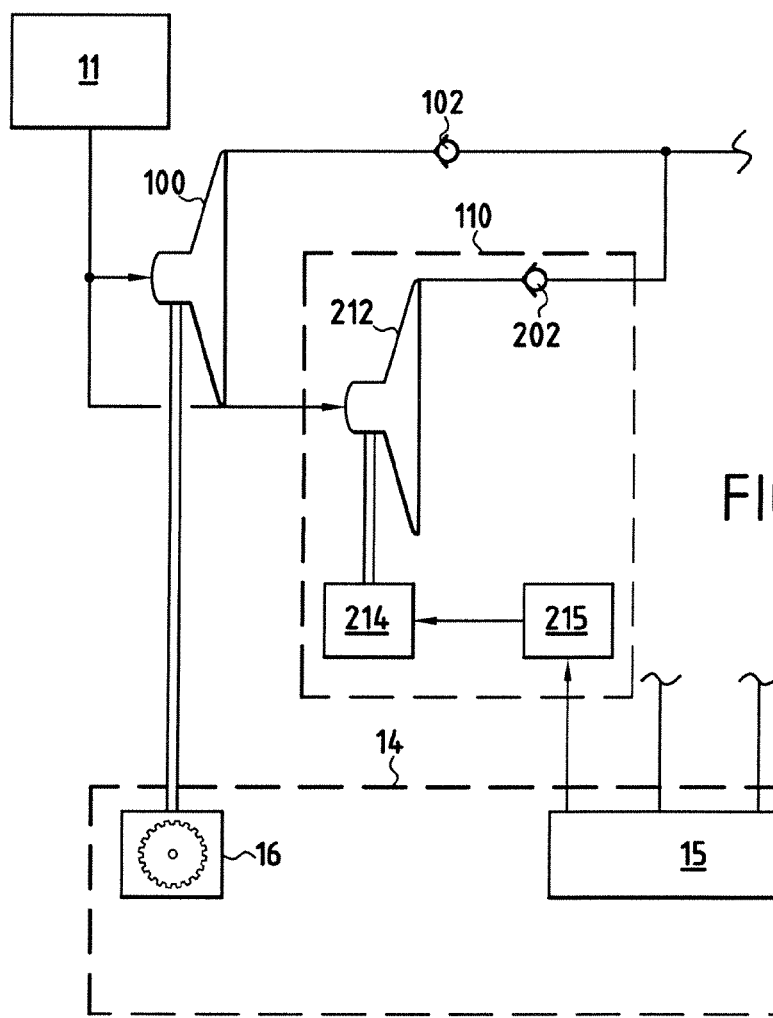
FIG. 3 is a fragmentary diagram showing a variant embodiment of the assistance pump unit of the fuel supply device of FIG. 1.

In another embodiment shown in FIG. 3, the assistance pump unit 110 comprises a centrifugal pump 212 having its inlet connected to the fuel circuit 11 and driven by a motor 214 controlled by an electronic control circuit 215 connected to the automatic control system 15 of the engine 14. A check valve 202 is mounted at the outlet from the pump 212. The centrifugal pump 212 is driven at a speed that enables it to deliver the minimum pressure Pm so long as said pressure cannot be supplied by the centrifugal pump 100. The operation of the centrifugal pump 212 can be interrupted and restarted, depending on requirements, in the same manner as for the pump 112 in the embodiment of FIG. 1. This other embodiment differs from that of FIG. 1 by the assistance pump unit being of simpler structure, but it can be envisaged only if the fuel circuit 11 is capable of delivering fuel that is free from air or vapor, even on starting.

The circuit 120 for regulating the fuel flow rate in the pipe comprises a mass flow meter 122 and a directly-controlled fuel valve 124 mounted in a pipe 126 connecting the pump 100 and the assistance pump unit 110 to the fuel injector device 12. The flow meter 122 is preferably mounted upstream from the valve 124. A heat exchanger circuit 128 between the oil for lubricating the members of the engine and the fuel, and a particle filter 130 can be inserted in the pipe 110 upstream from the flow meter 120, where such heat exchanger circuits and filter are themselves well known.

By way of example, the valve 124 is an electrically controlled valve. Opening of the valve is determined by an electromechanical actuator 125 such as an electric motor or actuator. The actuator 125 receives electricity from an electricity circuit of the engine 14, e.g. from a power supply integrated in the automatic control system 15 of the engine or from an electricity power supply bus of the engine 14. For redundancy purposes, two similar actuators 125, 125' could be provided that operate in parallel.

A local servo-control loop 132 powered from an electricity circuit of the engine receives a signal supplied by the mass flow meter 122 that is representative of the real mass flow rate of fuel in the pipe 126, and a signal supplied by the automatic control system 15 of the engine and representative of the desired setpoint value for the mass flow rate of fuel to be supplied to the engine 14. The actuator 125 is controlled as a function of the difference detected between the real mass flow rate and the setpoint mass flow rate so as to set the flow rate on the desired setpoint value.

Naturally, regulation can be provided by an electronic module integrated in the automatic control system 15 of the engine 14. The use of a local loop 132 external to the housing of the electronic module nevertheless serves to avoid having a link between the module and the flow meter 122.

An over-speed or over-thrust protection valve 134 for the engine 14 is mounted in the pipe 126 downstream from the valve 124. It is possible advantageously to use a directly-controlled valve with an electromechanical actuator 135, in a manner similar to the valve 124 and the actuator 125. The actuator 135 is controlled from the automatic control system 15 of the engine 14 via a module that is distinct from the module dedicated to performing regulation by means of the valve 124, for safety reasons. For redundancy purposes, two similar actuators 135, 135' may be provided that operate in parallel.

At normal engine speeds, in compliance with the setpoint, the valve 134 is in its maximally open position and the flow rate is controlled by the valve 124.

The automatic control system 15 receives information representative of the speed of the engine, e.g. information representative of the speed of rotation of the high pressure turbine. When an over-speed (or over-thrust) state is detected, i.e. a speed exceeding the speed setpoint value by more than a determined difference, and when that cannot be corrected by acting on the valve 124, the valve 134 is controlled so as to reduce the flow rate of fuel in the pipe 126.

The automatic control system 15 can be programmed to bring the valve 134 into a predetermined partially closed position that is safe, enabling fuel to be supplied at a lower rate. The use of a directly-controlled valve for the valve 134 is then advantageous in that it makes it possible to ensure that the engine continues to be controllable by modifying fuel flow rate, at least over a reduced range. This modification can be performed by the automatic control system 15 as a function of a desired engine speed. Thus, on detecting over-speed, the valve 134 takes over from the valve 124 and continues to allow flow rate to be varied, at least over a certain range.

Compared with prior art systems in which the operation of the over-speed valve is operation having two states: (i) fully open and (ii) cut off or open at a predetermined reduced amount, the possibility of regulating flow rate after over-speed or over-thrust has been detected enables thrust from the engine to be conserved and makes it possible to avoid a situation in which an imposed reduced flow rate can be unacceptable for the engine under certain conditions.

An on/off type closure valve 136 is mounted in the pipe 126, e.g. downstream from the valve 134. The valve 136 may be controlled by an electromechanical actuator 137. In known manner, the closure valve 136 can be actuated on command from the automatic control system 15 of the engine, or on a priority basis, from the airplane cockpit in order to turn off the engine 15 by interrupting its fuel supply.

Also in known manner, a totalizing mass flow meter 138 can be mounted in the pipe 126 downstream from the valve 136 to provide information about the total consumption of the engine in terms of weight of fuel.

The fuel requirement of an engine is expressed in terms of weight. Using the mass flow meter 122 thus makes it possible, within the limit of its margin of error, to regulate accurately the supply of fuel on the basis of a setpoint value for mass flow rate. The mass flow meter may be of the type described in documents US 2004/0123674 and US 2004/0129088.

Figure 4:
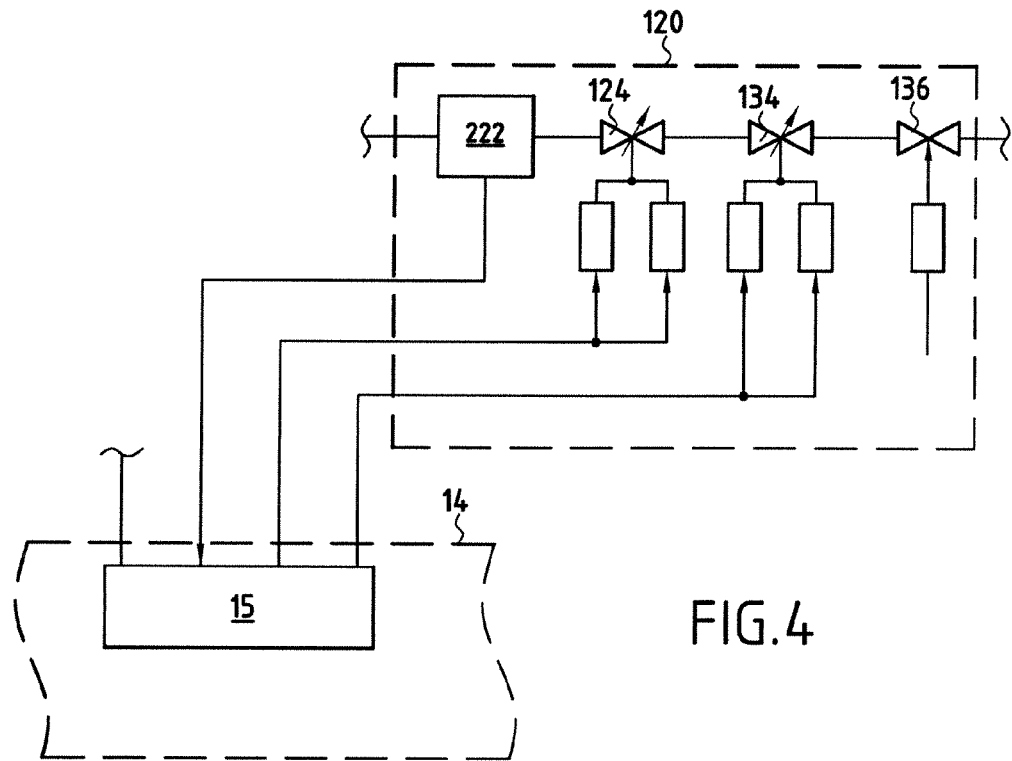
FIGS. 4 and 5 are fragmentary diagrams showing variant embodiments of the circuit for regulating the fuel flow rate in the fuel supply device of FIG. 1.

As shown in FIG. 4, it is nevertheless possible to replace the mass flow meter by a volumetric flow meter 222. The information concerning the real volume flow rate as measured by the flow meter 222 is transmitted to the automatic control system 15 of the engine 14. The system 15 is programmed to convert the requirements of the engine in terms of setpoint volume flow rate from an estimated value for the density of the fuel. The directly-controlled valve 124 is then controlled by the system 15 to servo-control the volume flow rate in the pipe 126 on the desired setpoint value.

Figure 5:
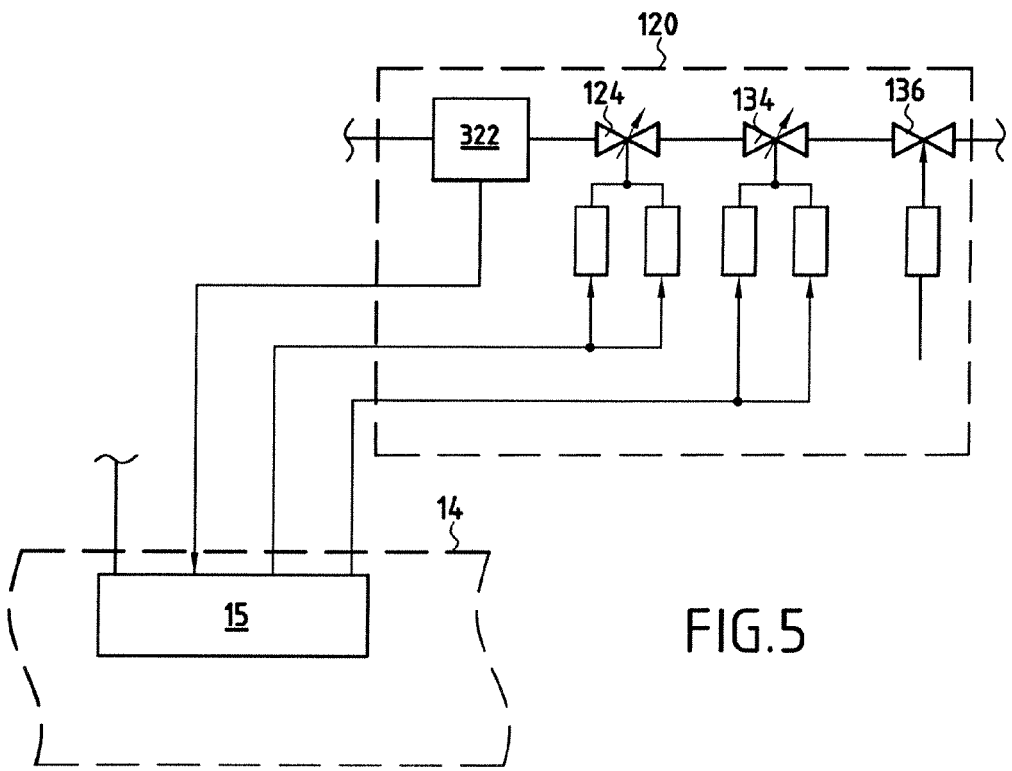

In yet another embodiment, as shown in FIG. 5, it is possible to use a device 322 that enables the flow rate to be measured on the basis of knowing the pressure drop $\Delta P$ through the device 322, the flow section for fuel through the device 322, and the density of the fuel. The flow rate is determined by a sensor (not shown) measuring the position of a valve through which head loss is set by a spring.

It should be observed that the device 322 is itself known. Reference can be made to document EP 1 344 917. The device 322 is also of structure analogous to that of hydraulic metering valves used in known systems for supplying fuel to airplane engines, such as that of document EP 1 355 054.

In the above description, the use is described of valves 124, 134, and 136 that are controlled electrically. In a variant, it is possible to use valves that are controlled hydraulically.

The invention claimed is:

1. A supply device for supplying fuel to an aircraft engine, the device comprising:
    a regulator circuit for regulating a fuel flow rate, the regulator circuit comprising a fuel flow rate measurement device, a controlled variable-restriction valve, and a control system configured to control the valve as a function of a setpoint value for the flow rate of fuel to be supplied to the engine;
    a centrifugal pump driven by mechanical coupling with the engine, having a low pressure inlet receiving fuel from a fuel tank of the aircraft and a high pressure outlet in fluid communication with the fuel flow rate regulator circuit; and
    an electrically controlled assistance pump unit having an inlet in fluid communication with the fuel tank of the aircraft and an outlet in fluid communication with the flow rate regulator circuit, to deliver at its outlet fuel at a predetermined minimum pressure,
    the pressure of the fuel supplied to the regulator circuit being greater of the pressures delivered in parallel by the centrifugal pump and by the assistance pump unit,
    in which the assistance pump unit comprises a positive-displacement pump and a pressure release valve having a first inlet receiving fuel from the outlet of the positive-displacement pump, a second inlet and receiving fuel from the fuel tank of the aircraft via a fuel supply path that does not pass through either of the centrifugal pump and the positive-displacement pump, and an outlet supplying fuel to the inlet of the positive-displacement pump,
    the pressure release valve putting its first inlet into communication with its outlet when the pressure difference between its first inlet and its second inlet exceeds a predetermined threshold to recirculate all the fuel received at its first inlet to the inlet of the positive-displacement pump;
    wherein the high pressure outlet of the centrifugal pump supplies fuel to a junction having a first supply path and a second supply path, the first supply path supplying fuel to the inlet of the positive-displacement pump via a fuel supply path that does not pass through the pressure release valve, the second supply path bypassing the positive-displacement pump and supplying fuel to the regulator circuit.

2. A device according to claim 1, in which the inlet of the positive-displacement pump is in fluid communication with the high pressure outlet of the centrifugal pump.

3. A device according to claim 1, further comprising a control circuit for stopping the assistance pump unit when the pressure of fuel delivered to the flow rate regulator circuit or the speed of the engine exceeds a predetermined pressure or speed threshold.

4. A device according to claim 1, further comprising a circuit for controlling restarting of the assistance pump unit when the pressure of the fuel delivered to the flow rate regulator circuit or the speed of the engine becomes less than a predetermined pressure or speed.

5. A device according to claim 1, in which the flow rate measurement device is a mass flow meter and the control system controls the valve as a function of a setpoint value for fuel mass flow rate.

6. A device according to claim 1, in which the valve is a directly-controlled valve that is electrically controlled.

7. A device according to claim 1, in which the control system includes a local servo-control loop connected directly to the flow rate measurement device and to the valve.

8. A device according to claim 1, in which the flow rate measurement device is a volumetric flow meter.

9. A device according to claim 1, in which the flow rate measurement device is a device enabling flow rate to be measured on the basis of knowledge of a pressure drop and flow section through the device.

10. A device according to claim 1, in which the fuel flow rate regulator circuit comprises:
a device for measuring fuel flow rate in a fuel supply pipe;
a first controlled variable-restriction valve mounted in the supply pipe;
a control system configured to control the first valve to supply the engine with fuel at a desired flow rate;
a second controlled variable-restriction valve mounted in the supply pipe in series with the first valve; and
control means for the second valve enabling the engine to be supplied with fuel at an adjustable, reduced flow rate, in response to detecting over-speed or over-thrust of the engine.

11. A device according to claim 10, in which the first and second valves are directly-controlled valves that are controlled electrically.

* * * * *